(12) United States Patent
Gracie et al.

(10) Patent No.: US 9,996,956 B1
(45) Date of Patent: Jun. 12, 2018

(54) GENERATING GRAPHICAL INDICATORS OF VARIOUS DATA FOR LINKED PARALLEL PRESENTATION

(71) Applicant: Amazon Technologies, Inc., Seattle, WA (US)

(72) Inventors: Samuel John Gracie, Seattle, WA (US); George Brookhart, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 15/376,571

(22) Filed: Dec. 12, 2016

(51) Int. Cl.
*G06T 11/20* (2006.01)
*G06F 17/30* (2006.01)

(52) U.S. Cl.
CPC ........ *G06T 11/206* (2013.01); *G06F 17/3028* (2013.01)

(58) Field of Classification Search
CPC ............................ G06T 11/206; G06F 17/3028
See application file for complete search history.

(56) References Cited

U.S. PATENT DOCUMENTS

| 2014/0375650 | A1* | 12/2014 | Grundstrom | .......... | G06T 11/206 345/440 |
| 2016/0086361 | A1* | 3/2016 | Ball | ...................... | G06T 11/206 345/440 |
| 2016/0359701 | A1* | 12/2016 | Pang | ................... | H04L 63/1425 |

\* cited by examiner

*Primary Examiner* — Jacinta M Crawford
(74) *Attorney, Agent, or Firm* — Eversheds Sutherland (US) LLP

(57) ABSTRACT

Systems, methods, and computer-readable media are disclosed for generating graphical indicators of various data for parallel presentation. Example methods include determining a set of data with first data and second data for a first segment and a second segment, determining a first ranking using the first data, where the first segment is ranked in a first position and the second segment is ranked in a second position, generating a first discrete visualization with a first graphical indicator for the first segment in a first location and a second graphical indicator for the second segment in a second location. Example methods may include determining a second ranking using the second data, where the first segment is ranked in the second position and the second segment is ranked in the first position, generating a second discrete visualization with a first graphical indicator and a second graphical indicator in the same respective locations.

20 Claims, 7 Drawing Sheets

GENERATING GRAPHICAL INDICATORS OF VARIOUS DATA FOR LINKED PARALLEL PRESENTATION

BACKGROUND

Content may be presented on electronic devices to users such that users can consume the content. Digital content may be presented to large numbers of users across many electronic devices and platforms. Users may consume or interact with certain content while other content may not be consumed or interacted with. Similarly, certain users may interact with certain content, while other users may not interact with the same content. Accordingly, tracking user interaction with content may be beneficial in determining effectiveness of content and/or user preferences. However, visually presenting large sets of data, such as user interaction with digital content, may be difficult. Similarly, presenting data in parallel format may be desired, so as to identify certain qualities of users and/or presented content.

Figure 1:
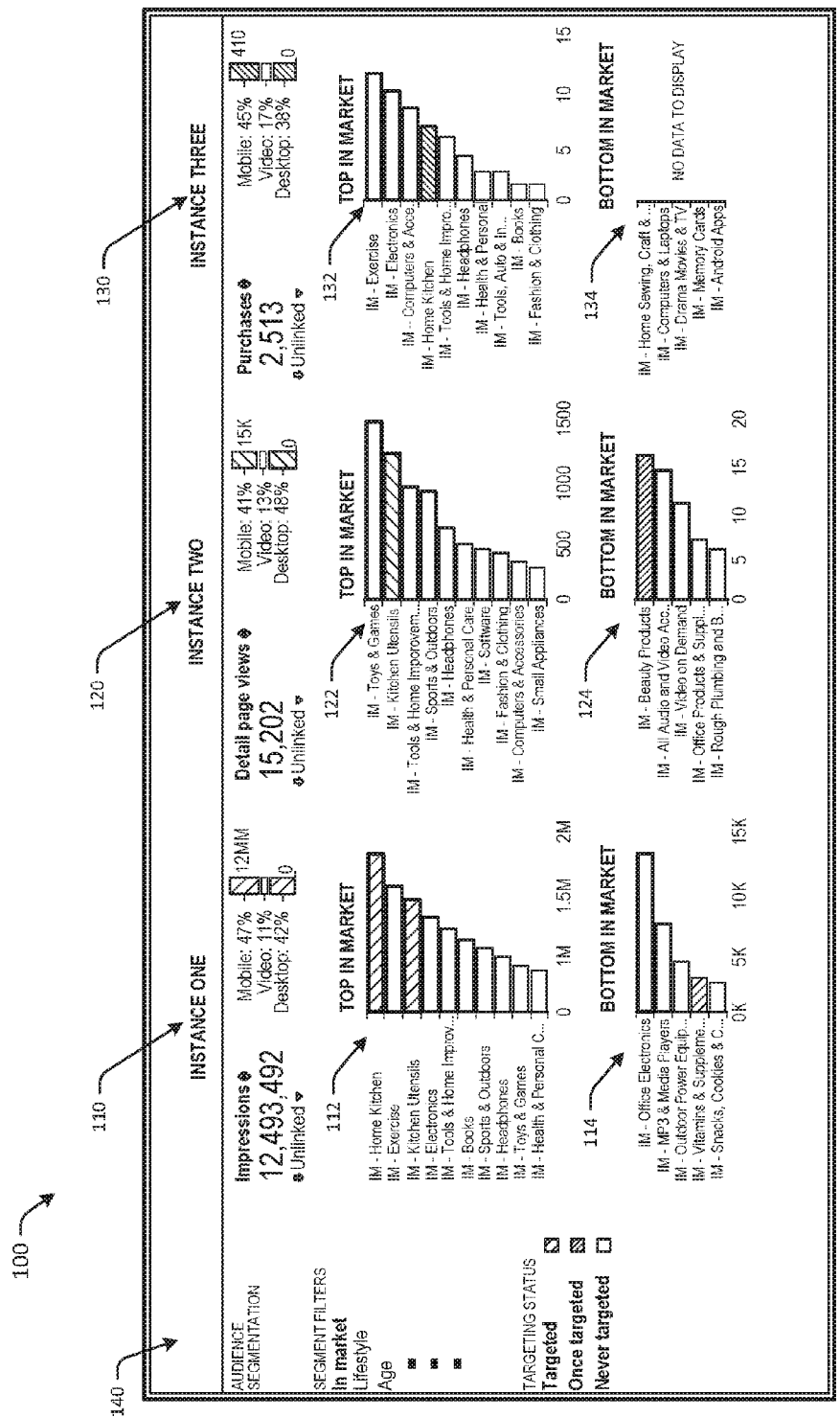
FIG. 1 is an example user interface presenting graphical indicators of multiple instances of various data in an unlinked parallel presentation in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users may consume the digital content. Content may be provided as part of content campaigns by content creators that desire for the content to be consumed or interacted with by users. In some instances, delivery of content may be scheduled based at least in part on delivery settings by campaign managers and/or content creators. Delivery settings may include targeting criteria, frequency constraints (e.g., how often a content impression can be presented to a user, etc.), pacing settings (e.g., smooth or linear delivery, time of day delivery, etc.), device type settings (e.g., devices at which impressions are to be served), and the like. Campaign performance may be tracked over time and used, at least in part, to determine effectiveness of a content delivery campaign. For example, campaign performance may be determined based at least in part on an amount of user interaction with content (e.g., how many users clicked on, read, watched, listened to, or otherwise interacted with content associated with the content delivery campaign, etc.), and campaign effectiveness may be determined, at least in part, based on user actions, such as purchases of certain products or services, that are attributed to content associated with the campaign. Such performance and/or effectiveness data associated with a content delivery campaign may be captured electronically. Other data that may be electronically captured may include device-specific or platform-specific performance (e.g., performance of tablet-presented content vs. laptop-presented content, in-app content performance vs. webpage content performance, etc.), user audience-specific data, and other data.

Data associated with content delivery campaigns may include a large number of data points. Processing such amounts of data and generating graphical indicators of certain data in visual formats may be used to present certain data in a linked parallel format. Graphical indicators presented in linked parallel format may assist in identifying certain trends or values that may otherwise be difficult to identify. For example, certain data associated with content delivery campaigns may be presented in a linked parallel format that can be used to identify which particular segments of users should be targeted with content, as well as performance of different segments of consumers to which content has been presented.

Embodiments of the disclosure may collect vast amounts of raw audience data associated with content delivery campaigns, and generate graphical indicators representing some or all of the collected data. The graphical indicators may be presented in parallel sets, such that the same data is presented in two or more formats or via two or more graphical indicators. In some instances, graphical indicators or sets of graphical indicators may be presented in a linked parallel presentation or linked parallel format. Linked parallel presentation may include one or more sets of data being held in a constant position over more than one set of graphical indicators. For example, a first set of graphical indicators may have a ranked set of data for various targeted consumer groups, where a teenager segment is in a third position. A second set of graphical indicators that is presented in a linked parallel presentation may be sorted in a different order; however the teenager segment may remain in the second position in the second set of graphical indicators, even though the teenager segment may not be the second highest value as sorted in the second set of graphical indicators. As a result, embodiments of the disclosure may be used to identify underperforming and/or overperforming sets of users, or to otherwise identify groups of one or more users to target so as to improve or increase performance of a content delivery campaign. Certain embodiments may generate graphical indicators that can be presented in linked parallel formats that may allow for quick manual identification of consumer segments and campaign effectiveness over the course of a purchase cycle. Such information may not be easily identifiable via automated processes and may include human judgment that can be assisted with the graphical indicators and data visualizations generated by embodiments of the disclosure.

Referring to FIG. 1, an example data visualization 100 illustrating graphical indicators of various data presented in an unlinked parallel presentation is depicted. The data visualization 100 may be a visual representation of one or more data points aggregated over time. For example, the data visualization 100 may present one or more graphical indicators of data related to content delivery campaigns. For example, as content impressions associated with a content delivery campaign are delivered, data related to the users to which impressions were delivered, user interactions with delivered impressions, attributed purchases or user actions, and other data may be collected. Such data may be used to generate graphical indicators that represent one or more portions of the raw collected data.

In FIG. 1 the data visualization 100 presents data in an unlinked parallel presentation. The parallel presentation includes a first instance 110 with a set of one or more graphical indicators 112 of at least a portion the data, a second instance 120 with a set of one or more graphical indicators 122 of at least a portion the data, and a third instance 130 with a set of one or more graphical indicators 132 of at least a portion the data. The set of data, in particular the collected audience data, may be duplicated one or more times and displayed in parallel on the same page or user interface. The respective graphical indicators may be generated based at least in part on a portion of the collected data for the content delivery campaign.

The multiple instances 110, 120, 130 may include the respective sets graphical indicators and may represent a path to conversion. In the example of FIG. 1, the path to conversion may include an exposure state represented by the first instance 110, which may be a state at which a user or consumer is first made aware of a particular product, service, brand, or other target for conversion, for example. In some instances, the exposure state may be reflective of the first time a certain user is presented with content, such as an advertisement, that is associated with a particular product or service. The second instance 120 may represent a consideration or engagement state, which may be actions indicating a user is interested in or is otherwise considering a product or service to which the user has been exposed by a content impression associated with the campaign. The third instance 130 may represent a conversion state, or a state at which the user converts, such as makes a purchase, watches a video, or another desired action. Other distribution channels that can be tracked and/or presented include audio, specific applications, and other distribution channels.

The data visualization 100 may include audience segmentation data 140 of an audience to which content impressions associated with a content delivery campaign have been delivered. The audience segmentation data 140 may include one or more selectable options that trigger presentation of data associated with various audience segments. Audience segments for content delivery campaigns may be attributed with one or more dimensions. Audience dimensions, which may be features, categories, characteristics, or other dimensions, may be categorized based at least in part on delivery metrics associated with a particular audience segment (e.g., a number of impressions delivered, a number of user interactions, such as clicks, etc.), performance metrics (e.g., click-through rate, purchase rate, etc.), and other metrics. Visualizing such metrics in a linked parallel format, as described herein, facilitates identification of optimization opportunities for content delivery settings, as well as other settings.

The audience segmentation data 140 may include one or more segment filters representing different audience segment filters that can be applied to the collected data. Audience segment filters can be applied to the collected raw data. In particular, audience segment filters can be applied to filter some or all of the collected audience data. Example audience segment filters may include an in market audience segment, or an audience segment of users that are in market or actively looking to purchase a product or service, a lifestyle audience segment, or audience data segmented by various lifestyle categories (e.g., cooks, active, techies or early adopters, vegetarians, etc.), an age segment filter that filters the audience data by age or age range, a demographic segment filter that filters that audience data by demographics, and so forth. Additional examples of audience segment filters include education segment filters, income segment filters, and other segment filters. In the example of FIG. 1, the in market segment may be selected and applied in the data visualization 100.

Audience segments that are currently targeted by a content delivery campaign may be indicated by a first modification to graphical indicators, while audience segments that were previously targeted may be indicated by a second modification to graphical indicators and audience segments that have not been targeted may be indicated by a third modification to graphical indicators. For example, a first modification to a graphical indicator may be a solid fill, solid color, solid shading, or another modification. A second modification to a graphical indicator may be a partial fill, a partial color, partial shading, or another modification that is different than the first modification. A third modification to a graphical indicator may be a different solid fill, a different color, a different shading, or another modification.

The data visualization 100 may include respective distribution channel and/or delivery device data for one or more instances of the presented data. For example, the first instance 110 may include a visualization of impressions delivered to a mobile device (47%), through a video distribution channel (11%), and through a desktop distribution channel (42%).

Each of the presented instances may be sorted using a different dimension. For example, the first instance 110 may be sorted by impression volume and targeting status. The second instance 120 may be sorted by detail page views and targeting status. The third instance 130 may be sorted by purchases and targeting status. Each of the three instances may be sorted in an independent descending order, as shown in FIG. 1, such that a segment with a highest number of respective impressions, detail page views, or purchases is at a top of the respective column.

In the first instance 110, the top in market performer may be a "home kitchen" segment, while the top performer in the second instance 120 may be a "toys & games" segment, and the third instance 130 top performer may be an "exercise" segment. Each segment may be represented by a graphical indicator configured to provide information. For example, the graphical indicator for the "home kitchen" segment in the first instance 110 may be relatively larger than the other graphical indicators in the first instance 110, so as to indicate that the "home kitchen" segment had more impressions delivered than any other segment. The graphical indicator for the "home kitchen" segment may also include a special shading to indicate that the "home kitchen" segment is a currently targeted segment. Whether a certain segment is targeted, was previously targeted, or has never been targeted may be indicated via the graphical or visual indicators. For example, graphical visual indicators may include visual features, such as shading, colors, icons, stickers, and other features to indicate a targeting status.

The data visualization 100 may include a fixed number of the top in market segment performers for each instance, as well as a fixed number of bottom in market segment performers. For example, the first instance 110 may include graphical indicators 114 associated with bottom performing segments ranked in descending order. The worst performing segment in the first instance 110, for example, may be a "snacks, cookies & chocolate" segment. Similarly, the second instance 120 may include graphical indicators 124 for bottom in market segments, and the third instance 130 may include graphical indicators 134 for bottom in market segments. For the third instance 130, there may not have been any purchases for the bottom performing segments, so there may be no data to display, as shown in FIG. 1.

The respective instances that present the collected data may have adjustable sort settings (e.g., descending, ascending, etc.), as well as a selectable setting to link one or more of the parallel presented instances. In the data visualization 100, each of the three instances is in an unlinked format. In visualizations of the disclosure, a combination of segment rank, sorting type, and graphical indicator visualization may be presented in a linked format so as to allow users to quickly identify overperforming and/or underperforming segments in various areas of interest, such as exposure, consideration, and conversion.

This disclosure relates to, among other things, systems, methods, computer-readable media, techniques, and methodologies for generating graphical indicators of various data for parallel presentation. Embodiments may generate visualizations that include dynamic linked parallel presentations of the same data that users can interact with. By analyzing the linked parallel presentations generated by this disclosure, users, such as campaign managers, may adjust one or more content delivery settings to increase exposure to high impact (e.g., relatively low impressions delivered and relatively high conversion or conversion percentage, etc.) groups, as well as to decrease exposure to low conversion groups.

Unlike conventional methods of data sorting, which may apply filters and constraints to a single data set, the linked data sorting described herein allows the same data set to be viewed multiple times and sorted in parallel. Further, the visualizations generated herein may be used to discover data insights when sorting across different dimensions.

By manipulating the same data in different sets of graphical indicators presented in a linked parallel format, certain trends, such as performance of different user segments in various aspects of a conversion process may be visually discerned. Based at least in part on the findings discovered via the visualizations described herein, specific user segments to target, how to target such user segments, and effectiveness metrics for respective user segments may be determined.

The systems, methods, computer-readable media, techniques, and methodologies for generating graphical indicators of various data for parallel presentation may result in improved control and effectiveness of content delivery campaigns, as well as improved and efficient use of computer resources and communications with semi-connected devices.

Example embodiments of the disclosure provide a number of technical features or technical effects. For example, in accordance with example embodiments of the disclosure, certain embodiments of the disclosure may generate graphical indicators and data visualizations that can be dynamically modified. For example, multiple instances of one set of data can be analyzed and graphical indicators for the data can be generated and presented in a linked parallel presentation. One of the instances can be used to control sorting of the other instances, and the resultant visualizations can reflect the controlled sorting. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
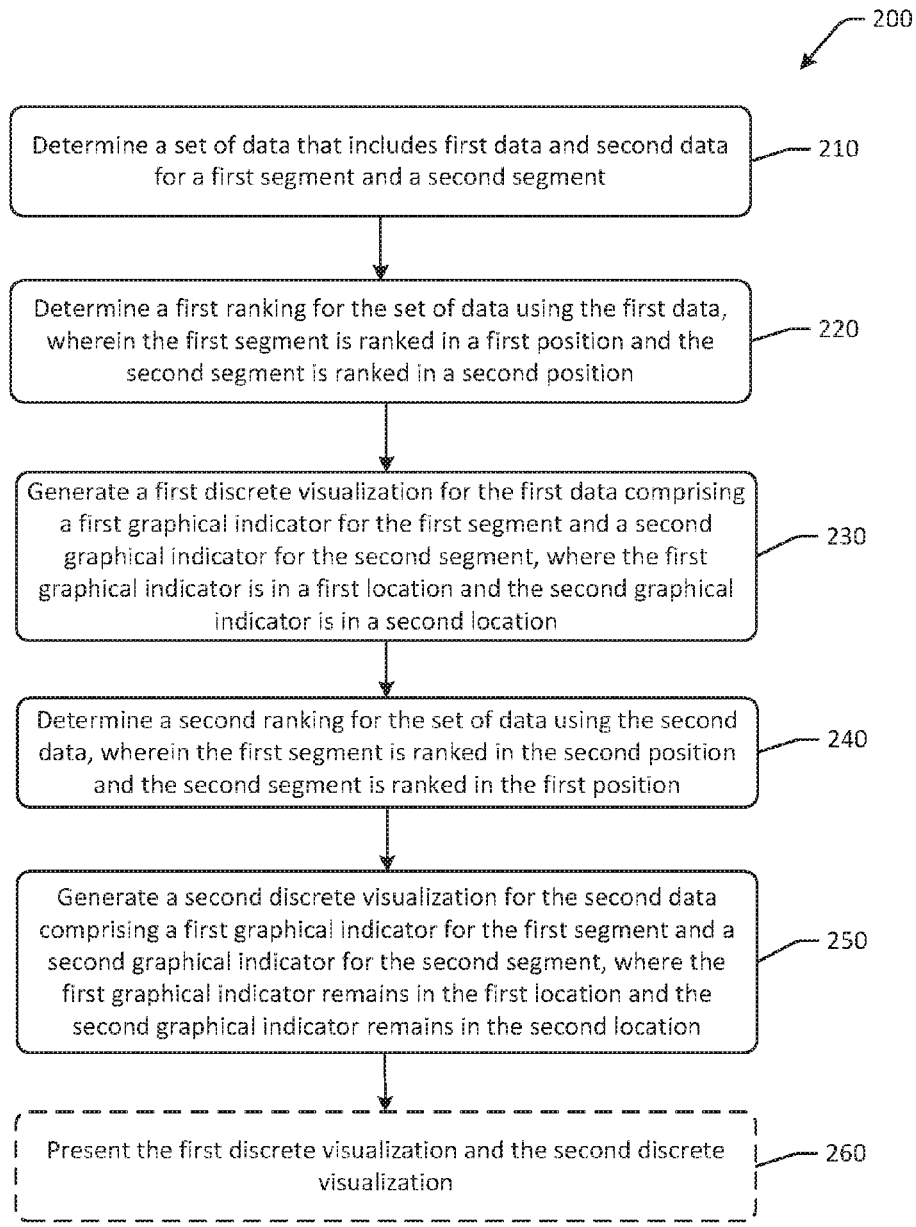
FIG. 2 is an example process flow diagram for generating graphical indicators of various data for parallel presentation in accordance with one or more embodiments of the disclosure.
Figure 3:
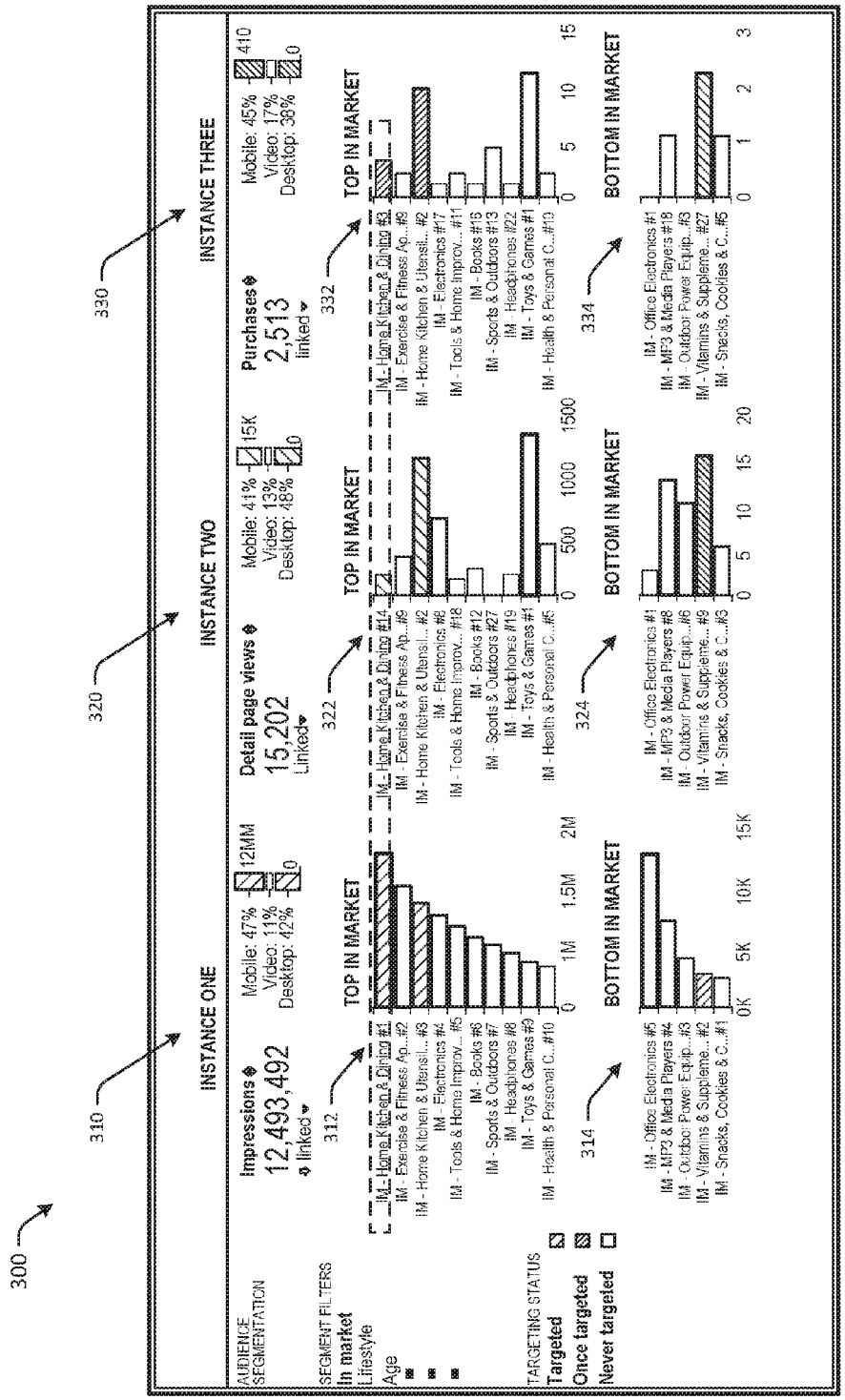
FIG. 3 is an example user interface presenting graphical indicators of multiple instances of various data in linked parallel presentation in accordance with one or more embodiments of the disclosure.

FIG. 2 is an example process flow 200 for generating graphical indicators of various data for linked parallel presentation in accordance with one or more embodiments of the disclosure. FIG. 3 will be discussed in conjunction with FIG. 2. FIG. 3 is an example user interface 300 presenting graphical indicators of multiple instances of various data in linked parallel presentation in accordance with one or more embodiments of the disclosure. Although certain operations are illustrated as occurring separately in FIG. 2, some or all of the operations may occur concurrently or partially concurrently across one or more computer systems.

At block 210 of the process flow 200 in FIG. 2, a set of data that includes first data and second data for a first segment and a second segment is determined. For example, computer-executable instructions of one or more data sorting module(s) stored at a remote server may be executed to determine a set of data that includes both first data and second data for both a first segment and a second segment. The first data may be a first metric, and the second data may be a second metric. For example, the first data may include a number of impressions delivered, and the second data may include a number of purchases attributed to the delivered impressions. The first segment may include a "home kitchen and dining" segment and the second segment may include an "exercise and fitness" segment. First and second data may be determined or collected for both the first segment and the second segment. In some embodiments, first data may be impression delivery data and the second data may be performance data of delivered impressions, or conversions.

In FIG. 3, the user interface 300 may include one or more sets of graphical indicators presented in a linked parallel presentation. One or more, or each, set of graphical indicators may be presented in separate columns. Other embodiments may present rows or another parallel configuration. The user interface 300 may include impression delivered data in a first column 310, detailed page view data in a second column 320, and purchase data for one or more segments in a third column 330, as shown in the respective columns of FIG. 3. The data being analyzed and/or presented in FIG. 3 may be audience data associated with characteristics of an audience that has been presented with digital impressions of a content delivery campaign.

The respective columns may be sorted based on different criteria (e.g., exposure, consideration/engagement, conversions, etc.), yet an order of the respective segments may be determined by one of the columns and applied to the other presented columns. The columns may be presented as part of a single user interface, or in a single screen, so as to facilitate side by side comparison by a user.

At block 220 of the process flow 200, a first ranking for the set of data is determined using the first data, where the first segment is ranked in a first position and the second segment is ranked in a second position. For example, computer-executable instructions of one or more data sorting module(s) stored at a remote server may be executed to determine a first ranking for the set of data using the first data, where the first segment is ranked in a first position and the second segment is ranked in a second position. In some embodiments, ranking may be based at least in part on the collected data.

In FIG. 3, each row in the respective columns of FIG. 3 may represent one of the audience segments. The first column 310 may include segments that are ranked in descending order by number of digital impressions that have been delivered for the respective segments. For example, the "home kitchen and dining" segment may be ranked in a first position, and the "exercise and fitness" segment may be ranked in a second position based on exposure, or the respective number of impressions that have been delivered to users in those segments.

To generate the first column 310, embodiments of the disclosure may apply a first filter, such as an exposure filter, to the audience data that is being analyzed or for which graphical indicators are to be generated. The exposure filter may cause one or more operations. For example, a data sorting module may determine a first number of digital impressions presented to a first segment of the audience, as well as a second number of digital impressions presented to a second segment of the audience, and so forth, for one or more of the available audience segments.

At block 230 of the process flow 200, a first discrete visualization for the first data comprising a first graphical indicator for the first segment and a second graphical indicator for the second segment is generated, where the first graphical indicator is in a first location and the second graphical indicator is in a second location. For example, computer-executable instructions of one or more visualization features module(s) stored at a remote server may be executed to generate a first discrete visualization for the first data comprising a first graphical indicator for the first segment and a second graphical indicator for the second segment.

In FIG. 3, the first column 310 may be a first discrete visualization. The user interface 300 may include graphical indicators 312 for the first column 310. The graphical indicators 312 may be associated with respective audience segments in respective rows, and may reflect quantitative values associated with the respective audience segment and column. For example, a first graphical indicator may be associated with the "home kitchen and dining" segment, and a second graphical indicator may be associated with the "exercise and fitness" segment, as shown in the graphical indicators 312. The respective graphical indicators may be in certain locations. For example, the locations may be certain rows, columns, positions, relative positions, or other digital locations on a particular user interface. Locations may be device specific and may be dependent on device characteristics, such as screen size, etc.

In addition to conveying relative size and/or relative numbers of delivered impressions, the graphical indicators 310 may convey information related to targeting of certain segments. For example, computer-executable instructions of one or more visualization features module(s) stored at a remote server may be executed to determine that a first segment, such as the "home kitchen and dining" segment is a presently targeted segment, and the graphical indicator for that segment may be configured to reflect the targeting. In the illustration of FIG. 3, targeting may be reflected by a certain kind of shading. Previously targeted or untargeted segments may be represented by different shading, or other differences in graphical indicators.

At block 240 of the process flow 200, a second ranking for the set of data using the second data is determined, where the first segment is ranked in the second position and the second segment is ranked in the first position. For example, computer-executable instructions of one or more presentation linking module(s) stored at a remote server may be executed to determine a second ranking for the set of data using the second data.

At block 250 of the process flow 200, a second discrete visualization for the second data comprising a first graphical indicator for the first segment and a second graphical indicator for the second segment is generated, where the first graphical indicator remains in the first location and the second graphical indicator remains in the second location. For example, computer-executable instructions of one or more visualization features module(s) stored at a remote server may be executed to generate a second discrete visualization for the second data comprising a first graphical indicator for the first segment and a second graphical indicator for the second segment.

In FIG. 3, the second column 320 may include a second instance of the audience data that corresponds to detail page views or a consideration phase, as opposed to the number of impressions in the first column 310. The second column 320 may be linked to the first column 310, such that the order of segments in the first column 310 is propagated to the second column 320, although the second column 320 presents different information (e.g., number of impressions vs. number of detail page views). For example, while in the first column 310, "home kitchen and dining" is in a first position and "exercise and fitness" is in a second position, in the second column, "home kitchen and dining" remains in the first position and "exercise and fitness" remains in the second position, although the respective segments are not necessarily ranked first and second with respect to detail page views.

At optional block 260 of the process flow 200, the first discrete visualization and the second discrete visualization is presented. For example, computer-executable instructions of one or more rendering module(s) stored at a remote server or locally may be executed to present the discrete visualizations, or the columns as illustrated in FIG. 3.

In FIG. 3, the second column 320 includes detail page view data for the respective audience segments, and is linked to the first column 310. Accordingly, the order of segments from the first column 310 is carried over to the second column 320. The third column 330 includes conversion data for the audience segments, and is also linked to the first column 310, so the order of segments from the first column 310 is carried over to the third column 330. The order of the segments in the first column 310 may be carried over from the top in market graphical indicators 312 and the bottom in market graphical indicators 314 to the top in market graphical indicators 322 and the bottom in market graphical indicators 324 of the second column 320, and to the top in market graphical indicators 332 and the bottom in market graphical indicators 334 of the third column 330.

The linked sorting mechanism, as shown in FIG. 3 as a selectable option in each of the columns, causes the same audience segments to be viewed regardless of their relative position or rank. The audience segments and respective graphical indicators or visual indicators are locked in their positions (e.g., row positions, etc.) in all data set instances or visualizations (e.g., across all columns, etc.), based on the rank of the respective segment that the sort has been applied to. For example, an untargeted segment that ranks #4 in the first column, which in the example of FIG. 3 would be an electronics segment, that visualizes an exposure event, may rank lower in impressions volume, but would still be shown in the 4th row of the conversion instance in the third column 330 because the position is locked by the linked sorting. In the illustrated scenario, a user viewing the user interface 300 and the respective data visualizations 310, 320, 330 may determine that there is an opportunity to explicitly target a "toy & games" segment that has outsized purchases in the third column 330, but is the ninth segment in the rankings by impression, or in the first column 310. Further, because the graphical indicator indicates that the "toys & games" segment has never been targeted, yet yields a relatively high purchase number or purchase rate, an opportunity may exist to start actively targeting the "toys & games" segment in order to improve campaign performance. The data visualizations presented in linked parallel presentation may facilitate identification of this opportunity.

The sorting method and linked parallel presentation illustrated in FIG. 3 and implemented, in one embodiment, by the process of FIG. 2, is distinct from other tabular data sorting methods because there are multiple instances of the same data that are presented in parallel, where each of the multiple instances is linked via a sorting mechanism to one of the instances or visualizations. Ranks for data in individual rows are controlled by one of the instances or visualizations. This is distinguished over a pivot or sorting on multiple dimensions simultaneously, as those methods do not show ranks in parallel, and/or relative to each dimension that the sort is applied to.

Adjustments to audience segments may result in relatively outsized impact to campaign performance. For example, in FIG. 3, the "exercise and fitness" segment may be driving a large volume of impressions (exposure), but not resulting in many purchases (conversion). Accordingly, a user may determine that the "exercise and fitness" should be removed from the targeting expression, or should be negatively targeted, as the impressions aren't converting into purchases. Conversely, if a segment is driving a larger number of sales, but receiving a lower impression volume, as is the case with the "toys & games" segment in FIG. 3, it may present an opportunity to target that segment, or help identify other lookalike audiences. Accordingly, optimizing selected audience segments may improve campaign performance or effectiveness. The metrics presented in FIG. 3, with the various instances of the data in linked parallel presentation, may be used to determine optimal audience segments or audience segments that result in relatively higher conversions with relatively fewer targeted impressions or exposure. Conversely, audience segments that have relatively high exposure or impression count, but do not have a corresponding level of conversions, can also be identified using the generated graphical indicators in the linked parallel presentation. The same linking may be applied to other portions of the data, such as the bottom in market segments.

Figure 4:
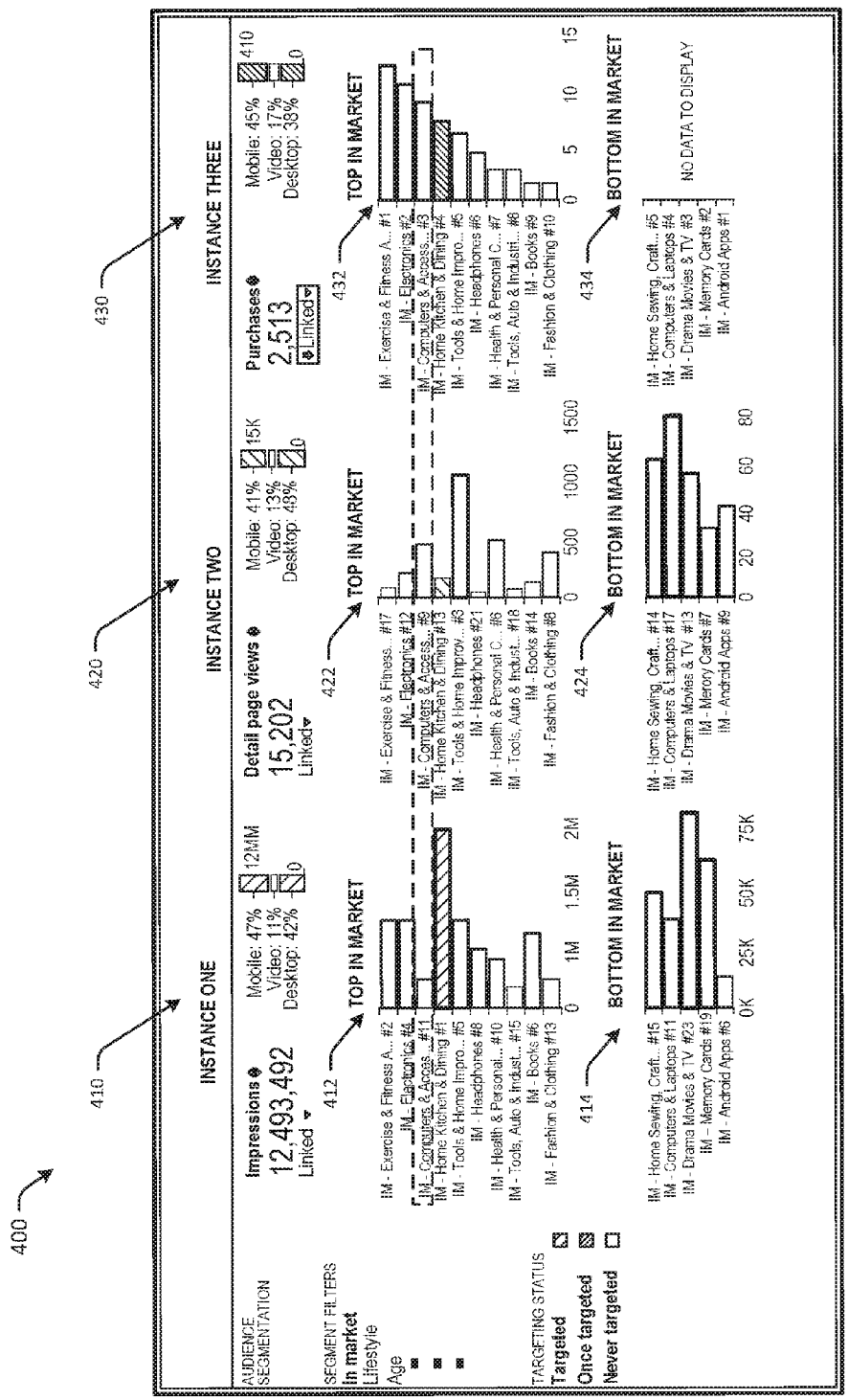
FIG. 4 is an example user interface presenting graphical indicators of multiple instances of various data in linked parallel presentation in accordance with one or more embodiments of the disclosure.

FIG. 4 is an example user interface 400 presenting graphical indicators of multiple instances of various data in linked parallel presentation in accordance with one or more embodiments of the disclosure. In FIG. 4, the same data set used to generate the data visualizations of FIG. 3 may be used to generate the data visualizations of FIG. 4. For example, FIG. 4 may include a first column or first data visualization 410, a second column or second data visualization 420, and a third column or third data visualization 430. Any number of data visualizations may be presented at the user interface 400. The data visualizations of FIG. 4 may be linked and sorted based on the sorting settings for the third visualization 430. In particular, the first data visualization 410 and the second data visualization 420 may both be linked to the third data visualization 430. Segment rows may be locked in position based on the rank of the segments in the sorted instance, which is the third instance or the third data visualization 430 in FIG. 4. One or more of the first data visualization 410, the second data visualization 420, and the third data visualization 430 may include individual ranking numbers in a column adjacent to the respective graphical indicators. For example, a first set of graphical indicators 412 and a second set of graphical indicators 414 may be included for the top and bottom, respectively, in market segments for the first data visualization 410, a third set of graphical indicators 422 and a second set of graphical indicators 424 may be included for the top and bottom, respectively, in market segments for the second data visualization 420, and a fifth set of graphical indicators 432 and a sixth set of graphical indicators 434 may be included for the top and bottom, respectively, in market segments for the third data visualization 430. Adjacent to each of the graphical indicators may be a separate column that indicates a numerical rank of the segment in the overall data visualization.

In the third data visualization 430, the "exercise and fitness" segment may be a top ranked segment for conversions or purchases. Accordingly, the "exercise and fitness" segment may be associated with a graphical or visual indicator that is larger than all the other graphical or visual indicators. For example, a graphical or visual indicator for an "electronics" segment that is ranked second may be smaller than the visual indicator for the "exercise and fitness" segment. The size and relative size of graphical indicators may be associated with the rank of respective segments.

Specifically, in some embodiments, a first size of a first graphical indicator in the first discrete data visualization 430 corresponds to a first position or top rank, and a second size of the second graphical indicator in the second discrete data visualization 420 corresponds to the second position, where the first size is larger than the second size.

The first data visualization 410 and the second data visualization 420 may be presented using the order of segments of the third data visualization 430. Accordingly, the "exercise and fitness" segment may remain in a top or first position in the first data visualization 410 and the second data visualization 420, and so forth. The order of the segments in the third data visualization 430 may be maintained throughout the other data visualizations that are linked to the third data visualization 430.

To generate the third data visualization 430, a performance filter may be applied to the audience data. The performance filter may be a filter that determines conversions of particular audience segments. A first number of purchases resulting from digital impressions presented to a first segment, such as an "exercise and fitness" audience segment, may be determined. A second number of purchases resulting from digital impressions presented to a second segment, such as an "electronics" audience segment, may be determined, and so forth.

If instead the second data visualization 420 was selected as the controlling instance or visualization, and the first data visualization 410 and third data visualization 430 were linked to the second data visualization 420, then the sorting of the second data visualization 420 would be carried over and row positions would be locked in across the first and third data visualizations based on the rankings in the second data visualization 420. For example, an engagement filter may be applied to the audience data. A first number of detailed page views resulting from digital impressions presented to a first segment may be determined, a second number of detailed page views resulting from digital impressions presented to a second segment may be determined, and so forth.

Using the user interface 400 and the visual indicators provided in the first data visualization 410, the second data visualization 420, and the third data visualization 430, a user may identify the "computers and accessories" segment as a segment that is driving relatively high conversions but not many impressions. Accordingly, there may be an opportunity to increase campaign performance by targeting the "computers and accessories" segment and/or by delivering more impressions to the "computers and accessories" segment.

Figure 5:
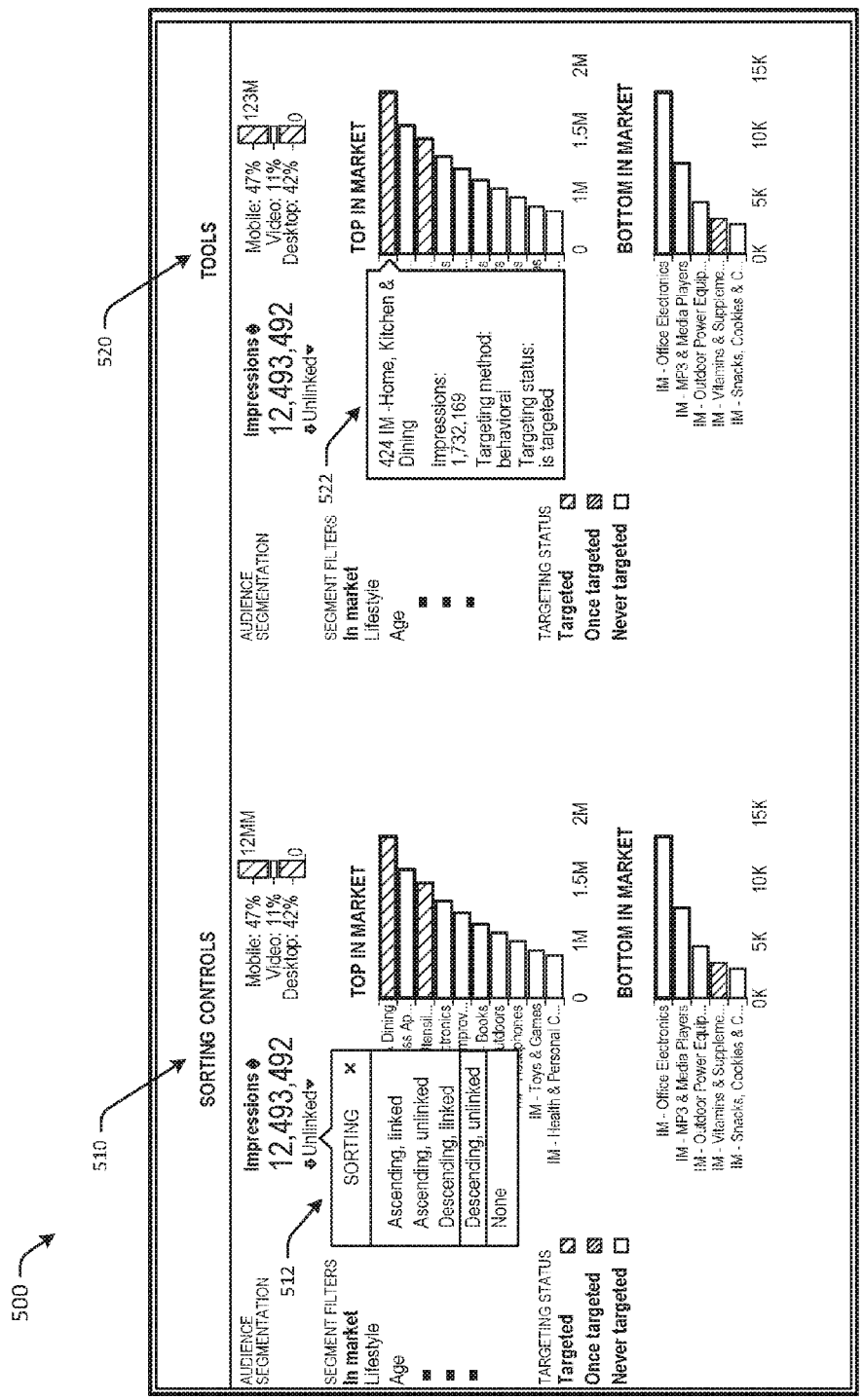
FIG. 5 is an example user interface presenting sorting controls and functionality for linked parallel presentations in accordance with one or more embodiments of the disclosure.

FIG. 5 is an example user interface 500 presenting sorting controls and functionality for linked parallel presentations in accordance with one or more embodiments of the disclosure. In FIG. 5, the user interface 500 may provide one or more selectable options for users to control sorting of one or more data set instances. For example, sorting controls 510 may allow users to select from ascending, descending, linked, unlinked, and other sorting options. Sorting options 512 may be presented in a user selectable format, for example as a pop-over dialogue or menu. If the user selects a particular sorting option, an indication to sort the set of data using a particular set or instance of data may be received, and the other data visualizations may be reordered according to the controlling visualization. The respective graphical indicator positions for the respective audience segments, as well as the corresponding order, may be fixed across all other visualizations based on the positioning in the controlling visualization.

A separate tools menu 520 may include values 522 of particular rows in the selected data set instance. The tools menu 520 may be accessed, in one example, by user interaction with a particular row (e.g., hovering over, clicking, tapping, etc.). Values 522 may include total impressions delivered to users of that segment, a targeting method, a targeting status, and the like. Additional information that can be provided in the tools menu 520 may include a potential amount of impressions that can be delivered to a particular segment, a total segment size, and other information related to the particular segment. For example, a total number of eligible users in a segment to which impressions could have been delivered during a time interval may be determined and may represent a possible set of users that can receive impressions in the future.

Figure 6:
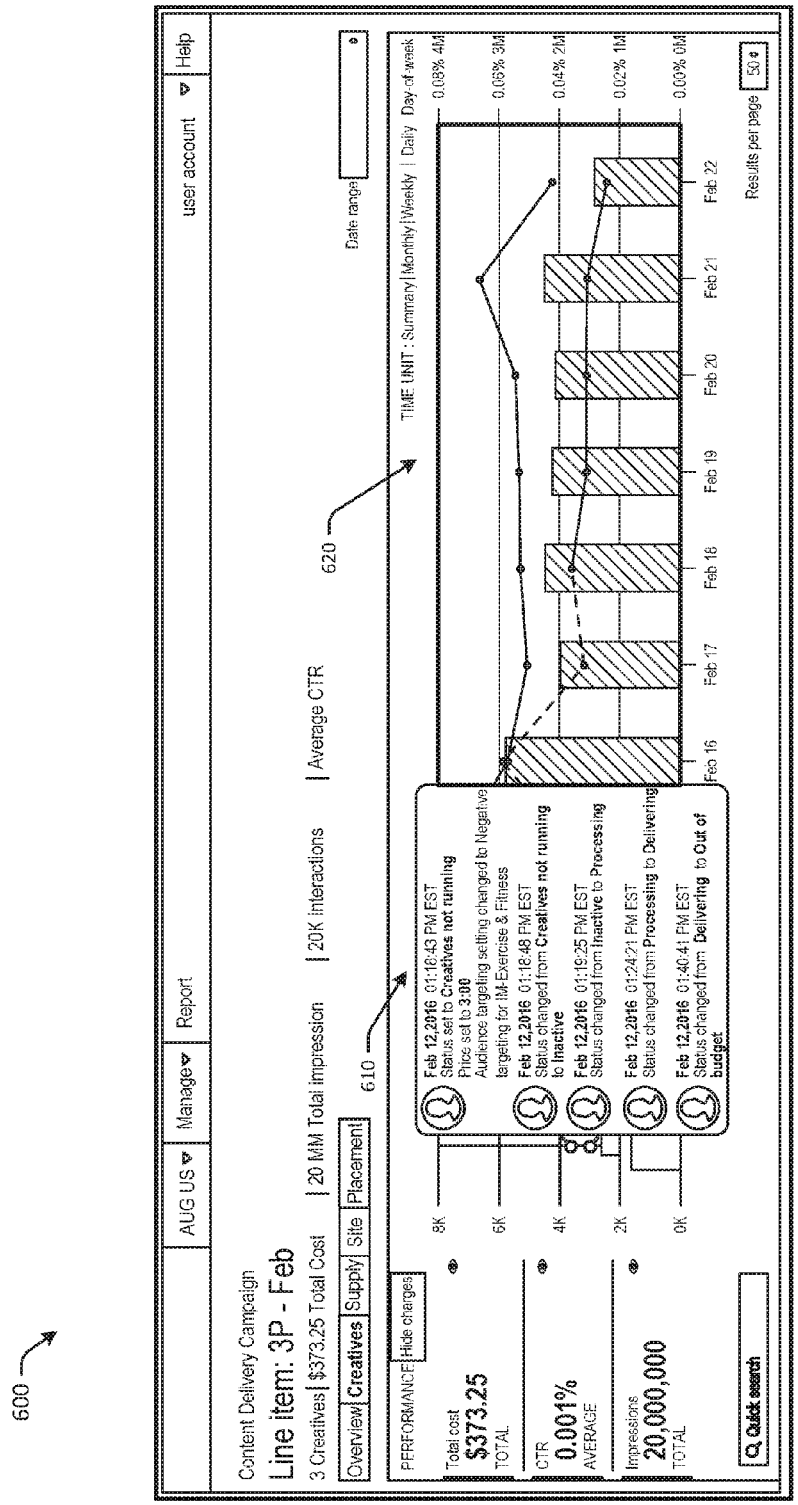
FIG. 6 is an example user interface illustrating collected data and performance over time in accordance with one or more embodiments of the disclosure.

FIG. 6 is an example user interface 600 illustrating collected data and performance over time in accordance with one or more embodiments of the disclosure. The user interface 600 may illustrate campaign performance over time, and may include information such as total cost, total impressions delivered, total user interaction, user interaction rates, and other information. A data visualization 620 may be included illustrating performance of the campaign over time. A campaign changes interface 610 may be presented indicating changes to the campaign, such as delivery settings, changes to targeting settings for specific segments, and the like, that occurred at various points during the campaign. Using this information, users may be able to monitor the effects of certain changes to the content delivery settings to the overall performance of the content delivery campaign.

One or more operations of the method, process flows, or use cases of FIGS. 1-6 may have been described above as being performed by a user device, or more specifically, by one or more program module(s), applications, or the like executing on a device. It should be appreciated, however, that any of the operations of methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
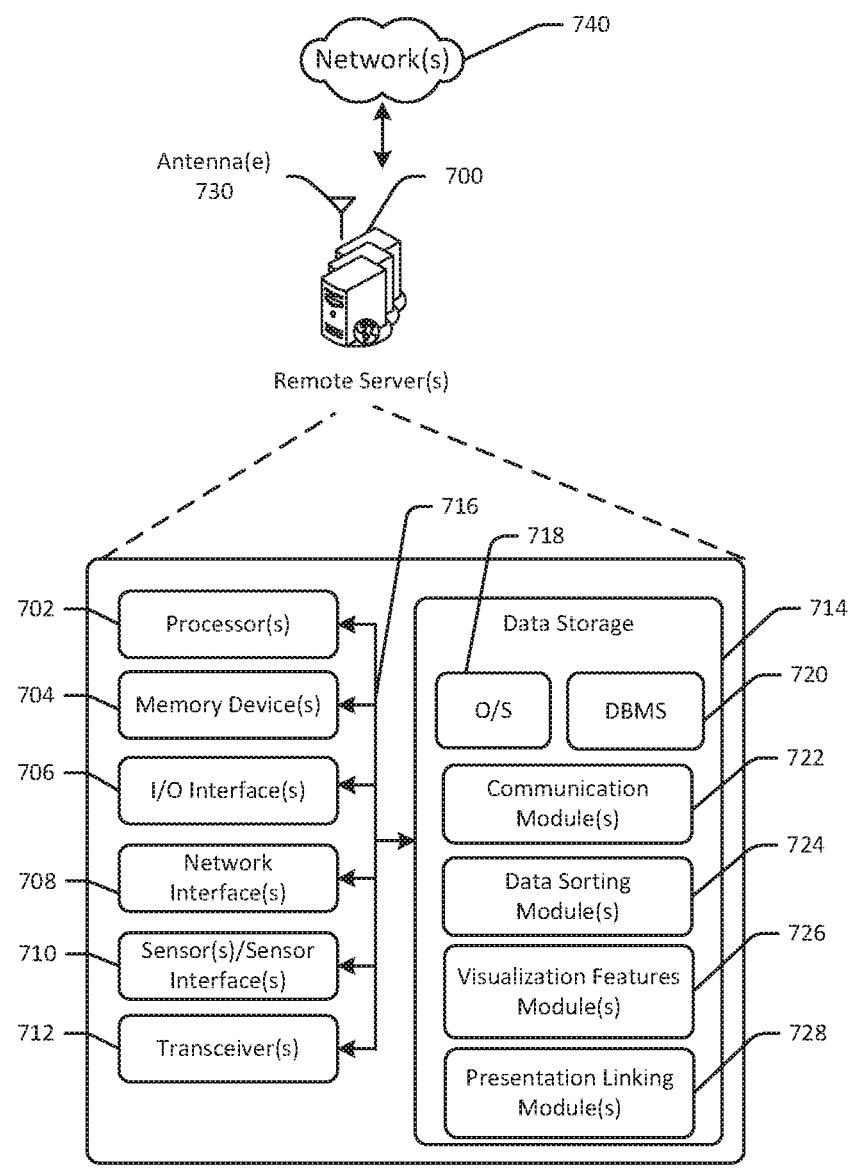
FIG. 7 schematically illustrates an example architecture of a system in accordance with one or more embodiments of the disclosure.

FIG. 7 is a schematic block diagram of one or more illustrative remote server(s) 700 in accordance with one or more example embodiments of the disclosure. The remote server(s) 700 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 700 may correspond to an illustrative device configuration for the data visualization server(s) of FIGS. 1-6.

The remote server(s) 700 may be configured to communicate via one or more networks with one or more servers, user devices, or the like. The remote server(s) 700 may be configured to retrieve and/or collect data, generate user interfaces, generate graphical indicators, generate data visualizations, generate linked instances of data visualizations, calculate certain metrics, such as performance metrics, and the like. The remote server(s) 700 may be configured to format data visualizations for certain devices and/or to satisfy certain parameters, and may be configured to generate visualizations or adjustments in response to user interactions. Certain embodiments may be configured to present one or more data visualizations at local or remote displays. In some embodiments, a single remote server or single group of remote servers may be configured to perform more than one type of data visualization functionality.

The remote server(s) 700 may be configured to communicate via one or more networks 740. Such network(s) 740 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 740 may have any suitable communication range associated therewith and may include, for example, global networks (e.g., the Internet), metropolitan area networks (MANs), wide area networks (WANs), local area networks (LANs), or personal area networks (PANs). In addition, such network(s) 740 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server(s) 700 may include one or more processors (processor(s)) 702, one or more memory devices 704 (generically referred to herein as memory 704), one or more input/output ("I/O") interface(s) 706, one or more network interface(s) 708, one or more sensors or sensor interface(s) 710, one or more transceivers 712, and data storage 714. The remote server(s) 700 may further include one or more buses 716 that functionally couple various components of the remote server(s) 700. The remote server(s) 700 may further include one or more antenna(e) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 716 may include at least one of a system bus, a memory bus, an address bus, or a message bus, and may permit the exchange of information (e.g., data (including computer-executable code), signaling, etc.) between various components of the remote server(s) 700. The bus(es) 716 may include, without limitation, a memory bus or a memory controller, a peripheral bus, an accelerated graphics port, and so forth. The bus(es) 716 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 714 may include removable storage and/or non-removable storage including, but not limited to, magnetic storage, optical disk storage, and/or tape storage. The data storage 714 may provide non-volatile storage of computer-executable instructions and other data. The memory 704 and the data storage 714, removable and/or non-removable, are examples of computer-readable storage media (CRSM) as that term is used herein.

The data storage 714 may store computer-executable code, instructions, or the like that may be loadable into the memory 704 and executable by the processor(s) 702 to cause the processor(s) 702 to perform or initiate various operations. The data storage 714 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to data storage 714 for non-volatile storage.

More specifically, the data storage 714 may store one or more operating systems (O/S) 718; one or more database management systems (DBMS) 720; and one or more program module(s), applications, engines, computer-executable code, scripts, or the like such as, for example, one or more communication module(s) 722, one or more data sorting module(s) 724, one or more visualization features module(s) 726, and/or one or more presentation linking module(s) 728. Some or all of these module(s) may be or include submodule(s). Any of the components depicted as being stored in data storage 714 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 714 may support the functionality described in reference to the corresponding components named earlier in this disclosure.

The data storage 714 may further store various types of data utilized by the components of the remote server(s) 700. Any data stored in the data storage 714 may be loaded into the memory 704 for use by the processor(s) 702 in executing computer-executable code. In addition, any data depicted as being stored in the data storage 714 may potentially be stored in one or more datastore(s) and may be accessed via the DBMS 720 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, an example datastore(s) may include, for example, historical device performance data, device profile data, device eligibility data, user profile data, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the communication module(s) 722 may include computer-executable instructions, code, or the like that responsive to execution by one or more of the processor(s) 702 may perform functions including, but not limited to, communicating with remote servers, communicating with remote datastores, communicating with electronic devices, determining a specific display at which to present a data visualization, sending or receiving information and instructions, and the like.

The data sorting module(s) 724 may include computer-executable instructions, code, or the like that responsive to execution by one or more of the processor(s) 702 may perform functions including, but not limited to, retrieving and/or collecting data, applying one or more filters to data sets, ranking sets of data based at least in part on user inputs, determining top performing audience segments, determining bottom performing audience segments, determining targeting status, and the like.

The visualization features module(s) 726 may include computer-executable instructions, code, or the like that responsive to execution by one or more of the processor(s) 702 may perform functions including, but not limited to, generating user interfaces, generating graphical or visual indicators with specific characteristics, generating data visualizations, generating linked instances of data visualizations, calculating certain metrics, such as performance metrics, and the like.

The presentation linking module(s) 728 may include computer-executable instructions, code, or the like that responsive to execution by one or more of the processor(s) 702 may perform functions including, but not limited to, identifying a controlling data visualization, reordering non-controlling data visualizations after visualizations are linked, determining orders for data visualizations based on a first visualization order, and the like.

Referring now to other illustrative components depicted as being stored in the data storage 714, the O/S 718 may be loaded from the data storage 714 into the memory 704 and may provide an interface between other application software executing on the remote server(s) 700 and the hardware resources of the remote server(s) 700. More specifically, the O/S 718 may include a set of computer-executable instructions for managing the hardware resources of the remote server(s) 700 and for providing common services to other application programs (e.g., managing memory allocation among various application programs). In certain example embodiments, the O/S 718 may control execution of the other program module(s) to dynamically enhance characters for content rendering. The O/S 718 may include any operating system now known or which may be developed in the future including, but not limited to, any server operating system, any mainframe operating system, or any other proprietary or non-proprietary operating system.

The DBMS 720 may be loaded into the memory 704 and may support functionality for accessing, retrieving, storing, and/or manipulating data stored in the memory 704 and/or data stored in the data storage 714. The DBMS 720 may use any of a variety of database models (e.g., relational model, object model, etc.) and may support any of a variety of query languages. The DBMS 720 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 700 is a mobile device, the DBMS 720 may be any suitable light-weight DBMS optimized for performance on a mobile device.

Referring now to other illustrative components of the remote server(s) 700, the input/output (I/O) interface(s) 706 may facilitate the receipt of input information by the remote server(s) 700 from one or more I/O devices as well as the output of information from the remote server(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 730 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 700 may further include one or more network interface(s) 708 via which the remote server(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(e) 730 may include any suitable type of antenna depending, for example, on the communications protocols used to transmit or receive signals via the antenna(e) 730. Non-limiting examples of suitable antennae may include directional antennae, non-directional antennae, dipole antennae, folded dipole antennae, patch antennae, multiple-input multiple-output (MIMO) antennae, or the like. The antenna(e) 730 may be communicatively coupled to one or more transceivers 712 or radio components to which or from which signals may be transmitted or received.

As previously described, the antenna(e) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 730 may additionally, or alternatively, include a Wi-Fi antenna configured to transmit or receive signals in accordance with established standards and protocols, such as the IEEE 1002.11 family of standards, including via 2.4 GHz channels (e.g., 1002.11b, 1002.11g, 1002.11n), 5 GHz channels (e.g., 1002.11n, 1002.11ac), or 60 GHz channels (e.g., 1002.11ad). In alternative example embodiments, the antenna(e) 730 may be configured to transmit or receive radio frequency signals within any suitable frequency range forming part of the unlicensed portion of the radio spectrum.

The antenna(e) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 730—transmitting or receiving radio frequency (RF) signals in the bandwidth and/or channels corresponding to the communications protocols utilized by the remote server(s) 700 to communicate with other devices. The transceiver(s) 712 may include hardware, software, and/or firmware for modulating, transmitting, or receiving—potentially in cooperation with any of antenna(e) 730—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 7 as being stored in the data storage 714 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 700, and/or hosted on other computing device(s) accessible via one or more networks, may be provided to support the functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server(s) 700 may include alternate and/or additional hardware, software, or firmware components beyond those described or depicted without departing from the scope of the disclosure. More particularly, it should be appreciated that software, firmware, or hardware components depicted as forming part of the remote server(s) 700 are merely illustrative and that some components may not be present or additional components may be provided in various embodiments. While various illustrative program module(s) have been depicted and described as software module(s) stored in the data storage 714, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component.

Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    determining, by one or more computer processors coupled to at least one memory, audience data comprising characteristics of an audience that has been presented with digital impressions of a content delivery campaign;
    applying an exposure filter to the audience data;
    determining a first number of digital impressions presented to a first segment of the audience;
    determining a second number of digital impressions presented to a second segment of the audience, wherein the second number of digital impressions is less than the first number of digital impressions;
    determining a third number of digital impressions presented to a third segment of the audience, wherein the third number of digital impressions is less than the second number of digital impressions;
    generating a first set of visual indicators for a first data visualization, the first set of visual indicators comprising a first visual indicator of the first number of digital impressions, a second visual indicator of the second number of digital impressions, wherein the second visual indicator is smaller than the first visual indicator, and a third visual indicator of the third number of digital impressions, wherein the third visual indicator is smaller than the second visual indicator;
    presenting the first data visualization representative of the exposure filter at a user interface, the first data visualization comprising the first set of visual indicators in an order, wherein the order comprises the first visual indicator in a first row, the second visual indicator in a second row, and the third visual indicator in a third row, wherein the second row is between the first row and the third row;
    applying an engagement filter to the audience data;
    determining a first number of detailed page views resulting from digital impressions presented to the first segment;
    determining a second number of detailed page views resulting from digital impressions presented to the second segment, wherein the second number of detailed page views is greater than the first number of detailed page views;
    determining a third number of detailed page views resulting from digital impressions presented to the third segment, wherein the third number of detailed page views is greater than the second number of detailed page views;
    generating a second set of visual indicators for a second data visualization that is representative of the engagement filter, the second set of visual indicators comprising a first visual indicator of the first number of detailed page views, a second visual indicator of the second number of detailed page views, wherein the second visual indicator is larger than the first visual indicator, and a third visual indicator of the third number of detailed page views, wherein the third visual indicator is larger than the second visual indicator; and presenting the second data visualization adjacent to the first data visualization at the user interface, the second data visualization comprising the second set of visual indicators in the order.

2. The method of claim 1, further comprising:

applying a performance filter to the audience data;

determining a first number of purchases resulting from digital impressions presented to the first segment;

determining a second number of purchases resulting from digital impressions presented to the second segment, wherein the second number of purchases is greater than the first number of purchases;

determining a third number of purchases resulting from digital impressions presented to the third segment, wherein the third number of purchases is less than the first number of purchases;

generating a third set of visual indicators for a third data visualization that is representative of the performance filter, the third set of visual indicators comprising a first visual indicator of the first number of purchases, a second visual indicator of the second number of purchases, wherein the second visual indicator is larger than the first visual indicator, and a third visual indicator of the third number of purchases, wherein the third visual indicator is smaller than the first visual indicator; and presenting the third data visualization adjacent to the second data visualization at the user interface, the third data visualization comprising the third set of visual indicators in the order.

3. The method of claim 2, further comprising:

ranking the first number of digital impressions, the second number of digital impressions, and the third number of digital impressions;

determining that the second data visualization is linked to the first data visualization; and determining that the third data visualization is linked to the first data visualization.

4. The method of claim 1, further comprising:

determining that the first segment is a targeted segment; and determining that the second segment was a previously targeted segment;

wherein generating the respective first visual indicators comprises generating the respective first visual indicators comprising a first shading indicating that the first segment is the targeted segment; and wherein generating the respective second visual indicators comprises generating the respective second visual indicators comprising a second shading indicating that the second segment was the previously targeted segment.

5. A method comprising:

determining, by one or more computer processors coupled to at least one memory, a set of data comprising first data and second data, the set of data comprising data for a first segment and a second segment;

determining a first ranking for the set of data using the first data, wherein the first segment is ranked in a first position and the second segment is ranked in a second position;

generating a first discrete visualization for the first data comprising a first graphical indicator for the first segment and a second graphical indicator for the second segment, the first discrete visualization comprising the first graphical indicator in a first location and the second graphical indicator in a second location;

determining a second ranking for the set of data using the second data, wherein the first segment is ranked in the second position and the second segment is ranked in the first position;

generating a second discrete visualization for the second data comprising a third graphical indicator for the first segment and a fourth graphical indicator for the second segment, the second discrete visualization comprising the third graphical indicator in the first location and the fourth graphical indicator in the second location; and causing presentation of the first discrete visualization and the second discrete visualization.

6. The method of claim 5, wherein the first data is impression delivery data and the second data is performance data of delivered impressions.

7. The method of claim 5, wherein the first discrete visualization and the second discrete visualization are presented in parallel at a user interface.

8. The method of claim 5, further comprising:

receiving an indication to sort the set of data using the second data;

determining that the first discrete visualization is linked to the second discrete visualization;

generating a third discrete visualization for the second data comprising the first graphical indicator in the second location and the second graphical indicator in the first location; and generating a fourth discrete visualization for the first data comprising the third graphical indicator in the second location and the fourth graphical indicator in the first location.

9. The method of claim 5, wherein the first data is impression delivery data, the method further comprising:

determining a total number of eligible users in the first segment to which impressions could have been delivered during a time interval;

determining a user interaction with the first graphical indicator; and presenting the total number of eligible users.

10. The method of claim 5, wherein the first position of the first graphical indicator is fixed in both the first discrete visualization and the second discrete visualization.

11. The method of claim 5, wherein an order of the respective graphical indicators in the second discrete visualization is dependent on the first ranking in the first discrete visualization.

12. The method of claim 5, wherein the first position is a top-ranked position and the second position is a bottom-ranked position.

13. The method of claim 5, further comprising:

determining that the first segment is a targeted segment; and determining that the second segment was a previously targeted segment;

wherein the respective first graphical indicator and the third graphical indicator comprise a first visual feature indicating that the first segment is the targeted segment; and wherein the respective second graphical indicators comprise a second visual feature indicating that the second segment was the previously targeted segment.

14. The method of claim 5, wherein a first size of the first graphical indicator corresponds to the first position, and a second size of the second graphical indicator in the second discrete visualization corresponds to the second position, wherein the first size is larger than the second size.

15. The method of claim 5, wherein the set of data further comprises third data, the method further comprising:
   determining a third ranking for the set of data using the third data, wherein the first segment is ranked in a third position and the second segment is ranked in a fourth position;
   generating a third discrete visualization for the third data comprising a fifth graphical indicator for the first segment and a sixth graphical indicator for the second segment, the third discrete visualization comprising the fifth graphical indicator in the first location and the sixth graphical indicator in the second location; and
   presenting the third discrete visualization.

16. The method of claim 5, further comprising:
   receiving an indication that the second discrete visualization is linked to the first discrete visualization.

17. A device comprising:
   at least one memory that stores computer-executable instructions;
   at least one processor configured to access the at least one memory and execute the computer-executable instructions to:
      determine a set of data comprising first metric and second metric, the set of data comprising data for a first segment and a second segment;
      determine a first ranking for the set of data using the first metric, wherein the first segment is ranked in a first position and the second segment is ranked in a second position;
      generate a first discrete visualization for the first data comprising a first graphical indicator for the first segment and a second graphical indicator for the second segment, the first discrete visualization comprising the first graphical indicator in a first location and the second graphical indicator in a second location;
      determine a second ranking for the set of data using the second metric, wherein the first segment is ranked in the second position and the second segment is ranked in the first position;
      generate a second discrete visualization for the second data comprising a third graphical indicator for the first segment and a fourth graphical indicator for the second segment, the second discrete visualization comprising the third graphical indicator in the first location and the fourth graphical indicator in the second location; and
      cause presentation of the first discrete visualization and the second discrete visualization.

18. The device of claim 17, wherein the first metric is impression delivery data and the second metric is performance data of delivered impressions, and wherein the first discrete visualization and the second discrete visualization are presented in parallel at a user interface.

19. The device of claim 17, wherein the at least one processor is further configured to access the at least one memory and execute the computer-executable instructions to:
   receive an indication to sort the set of data using the second metric;
   determine that the first discrete visualization is linked to the second discrete visualization;
   generate a third discrete visualization for the second metric comprising the third graphical indicator in the second location and the fourth graphical indicator in the first location; and
   generate a fourth discrete visualization for the first metric comprising the first graphical indicator in the second location and the second graphical indicator in the first location.

20. The device of claim 17, wherein the at least one processor is further configured to access the at least one memory and execute the computer-executable instructions to:
   determine that the first segment is a targeted segment; and
   determine that the second segment was a previously targeted segment;
   wherein the first graphical indicator and the third graphical indicators comprise a first visual feature indicating that the first segment is the targeted segment; and
   wherein the respective second graphical indicators comprise a second visual feature indicating that the second segment was the previously targeted segment.

* * * * *